United States Patent
Kohn et al.

(10) Patent No.: US 10,671,883 B1
(45) Date of Patent: *Jun. 2, 2020

(54) APPROXIMATE CROSS-CHECK FOR REAL-TIME FEATURE MATCHING

(71) Applicant: Ambarella International LP, Santa Clara, CA (US)

(72) Inventors: Leslie D. Kohn, Saratoga, CA (US); Guy Rapaport, Sunnyvale, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,356

(22) Filed: Mar. 29, 2019

Related U.S. Application Data

(63) Continuation of application No. 15/590,251, filed on May 9, 2017, now Pat. No. 10,303,974, which is a continuation-in-part of application No. 15/581,436, filed on Apr. 28, 2017, now abandoned.

(51) Int. Cl.
*G06K 9/62* (2006.01)
*G06K 9/00* (2006.01)
*G06K 9/46* (2006.01)

(52) U.S. Cl.
CPC ....... *G06K 9/6215* (2013.01); *G06K 9/00744* (2013.01); *G06K 9/00758* (2013.01); *G06K 9/4609* (2013.01); *G06K 9/4671* (2013.01)

(58) Field of Classification Search
None
See application file for complete search history.

(56) References Cited

U.S. PATENT DOCUMENTS

| | | | |
|---|---|---|---|
| 6,504,569 B1 | 1/2003 | Jasinschi | 345/950 |
| 2012/0069203 A1* | 3/2012 | Voss | H04N 5/144 348/208.1 |
| 2014/0266382 A1* | 9/2014 | Kwon | G11C 7/1084 327/321 |
| 2015/0078629 A1* | 3/2015 | Gottemukkula | G06K 9/0061 382/117 |
| 2016/0092727 A1* | 3/2016 | Ren | G06K 9/00369 382/103 |
| 2017/0091952 A1* | 3/2017 | Sun | G06T 5/10 |

* cited by examiner

*Primary Examiner* — David Perlman
(74) *Attorney, Agent, or Firm* — Christopher P. Maiorana, PC

(57) ABSTRACT

A method of feature matching is provided. The method includes the steps of (A) determining a set of correspondences between a set of reference feature points for a first image and a set of target feature points for a second image using a processor to compute a descriptor matching function for each pair of reference and target feature points and (B) reducing the set of correspondences using the processor to perform an approximate cross-check to obtain a set of valid correspondences based upon the descriptor matching function computed for each pair of feature points.

20 Claims, 8 Drawing Sheets

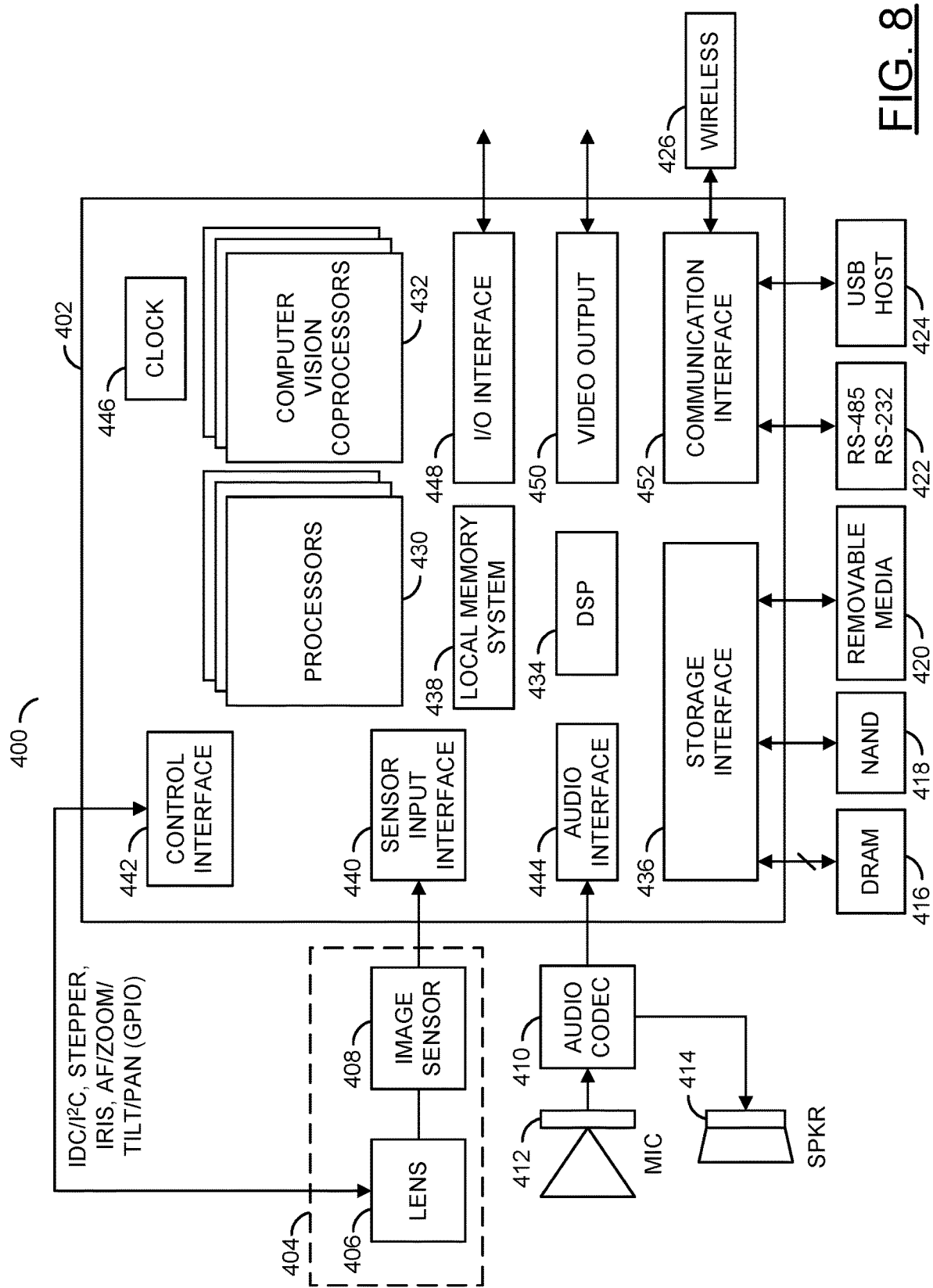

APPROXIMATE CROSS-CHECK FOR REAL-TIME FEATURE MATCHING

This application relates to U.S. Ser. No. 15/590,251, filed May 9, 2017, which relates to U.S. Ser. No. 15/581,436, filed Apr. 28, 2017, now abandoned, which are each incorporated by reference in their entirety.

FIELD OF THE INVENTION

The invention relates to computer vision generally and, more particularly, to a method and/or apparatus for implementing an approximate cross-check for real-time feature matching.

BACKGROUND

Feature extraction and matching are common low level building blocks in computer vision pipelines. By tracking feature points temporally, ego-motion of the capturing platform or a motion model of the observed objects in a scene may be estimated. In order to track the feature points, a matching algorithm is used to find the most probable correspondences between feature points in a reference frame and a target frame. In order to match pairs of feature points, each feature point is represented by a descriptor. The matching algorithm uses a distance function that compares the two descriptors. The minimal distance is taken as pointing to the best pair correspondences.

Conventional techniques apply a brute-force approach to matching feature points. The result is a list of correspondences with respective matching distance results, showing the best matching (if existing), for each reference feature, in the target feature set. The matching process is prone to errors in some cases. In one example, a specific reference feature point may not have an actual target feature point match. As a result, the next best target feature point is wrongly matched with the specific reference feature point. In another example, a specific reference feature point may have an actual target feature point match, but the best match score wrongly points to another target feature point.

In order to minimize such errors, a cross check process is applied. The conventional cross-check process is computationally expensive. The conventional cross-check process runs the matching process twice, or uses large memory buffers in order to store intermediate descriptor matching results. A simpler approach only runs the second, cross-check matching on target features that have been identified as possible pairs of the first pass matching process. However, in a worst case scenario, the full cross-check process has to be performed, which is costly.

It would be desirable to implement an approximate cross-check for real-time feature matching.

SUMMARY

The invention concerns a method of feature matching including the steps of (A) determining a set of correspondences between a set of reference feature points for a first image and a set of target feature points for a second image using a processor to compute a descriptor matching function for each pair of reference and target feature points and (B) reducing the set of correspondences using the processor to perform an approximate cross-check to obtain a set of valid correspondences based upon the descriptor matching function computed for each pair of feature points.

BRIEF DESCRIPTION OF THE FIGURES

Embodiments of the invention will be apparent from the following detailed description and the appended claims and drawings in which:

FIG. 8 is a diagram illustrating a camera system incorporating matching with approximate cross-check in accordance with an embodiment of the invention.

DETAILED DESCRIPTION OF THE EMBODIMENTS

Embodiments of the present invention include providing an approximate cross-check for real-time feature matching that may (i) be performed in a single run or pass, (ii) eliminate multiple matching runs used by conventional techniques, (iii) allow error reduction performance similar to conventional approaches, (iv) be performed in a smaller computational budget, (v) involve only a marginal additional memory demand, (vi) be implemented solely in hardware, and/or (vii) be implemented as one or more integrated circuits.

Feature extraction and matching are common low level building blocks in computer vision pipelines. Feature points typically represent interesting areas in the images (e.g. corners, edges, etc.). By tracking the feature points temporally, an estimate of ego-motion of the capturing platform or a motion model of observed objects in the scene may be generated. In order to track the feature points, a matching algorithm is generally incorporated to find the most probable correspondences between feature points in a reference frame and a target frame. In a process to match pairs of reference and target feature points, each feature point may be represented by a descriptor (e.g., image patch, SIFT, BRIEF, ORB, FREAK, etc.).

In an example, a set R of reference feature points from a first (reference) image may be denoted as $R=\{r_i\}$, $i=1, \ldots, Nr$, and a set T of target feature points from a second (target) image may be denoted as $T=\{t_j\}$, $j=1, \ldots, Nt$. Nr and Nt are the number of feature points in the reference and target images, respectively. A descriptor for feature point $r_i$ may be denoted as $D_r^i$. A descriptor for feature point $t_j$ may be denoted as $D_t^j$. In various embodiments, the matching algorithm may use a distance function (e.g., Dist (x,y)) that compares the two descriptors of each pair of reference and target feature points (e.g., $Dist(D_r^i$, $D_i^j$)). The minimal distance generally points to the best pair correspondences. In various embodiments, an approximate cross-check in accordance with the invention is performed as part of the matching process. After running over all the reference feature points $r_i$ in the reference set R, the valid correspondences $r_i \rightarrow t_j$ is generally obtained.

Figure 1:
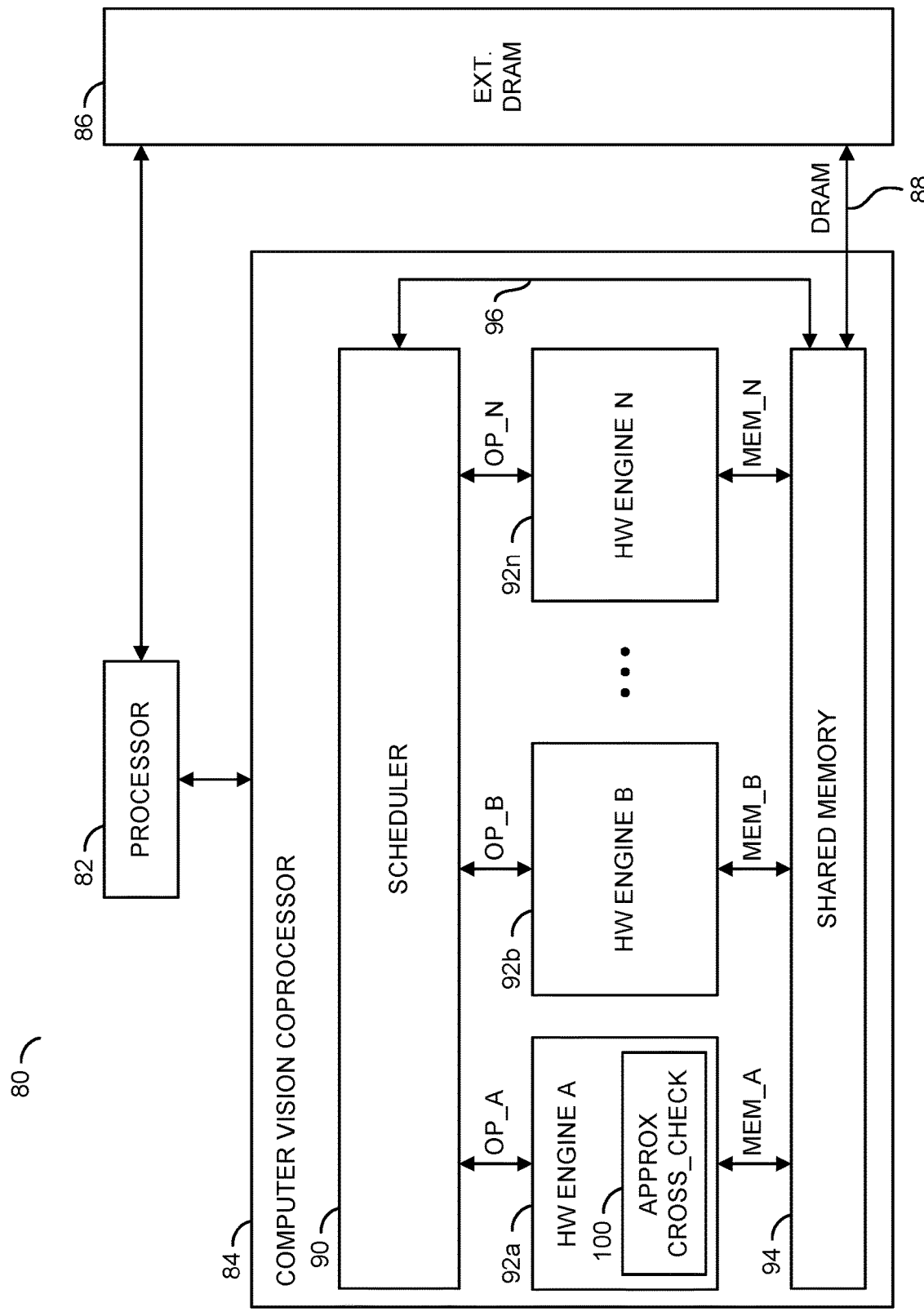
FIG. 1 is a diagram illustrating a context in which a matching with approximate cross-check operation in accordance with an example embodiment of the invention may be implemented.

Referring to FIG. 1, a diagram of a system 80 is shown illustrating a context in which a matching process incorporating an approximate cross-check approach in accordance with an example embodiment of the invention may be implemented. The system (or apparatus) 80 may be implemented as part of a computer vision system. In various embodiments, the system 80 may be implemented as part of a camera, a computer, a server (e.g., a cloud server), a smart phone (e.g., a cellular telephone), a personal digital assistant, or the like. The system 80 may be configured for applications including, but not limited to autonomous and semi-autonomous vehicles (e.g., cars, trucks, agricultural machinery, drones, etc.), manufacturing, and security/surveillance systems. In contrast to a general purpose computer, the system 80 generally comprises hardware circuitry that is optimized to provide a high performance image processing and computer vision pipeline in minimal area and with minimal power consumption.

In an example embodiment, the system 80 generally comprises a block (or circuit) 82, a block (or circuit) 84, a block (or circuit) 86 and a memory bus 88. The circuit 84 generally comprises a block (or circuit) 90, one or more blocks (or circuits) 92a-92n, a block (or circuit) 94 and a path 96. In an example embodiment, one or more of the circuits 92a-92n may comprise a block (or circuit) 100 configured to provide an approximate cross-check in accordance with the invention as part of a feature matching process.

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM_A to MEM_N) may be exchanged between the respective circuits 92a-92n and the circuit 94. The signals MEM_A to MEM_N may carry data. A signal (e.g., DRAM) may be exchanged between the circuit 86 and the circuit 94. The signal DRAM may transfer data between the circuits 86 and 94.

The circuit 82 may implement a processor circuit. In some embodiments, the processor circuit 82 may be a general purpose processor circuit. The processor circuit 82 may be operational to interact with the circuit 84 and the circuit 86 to perform various processing tasks.

The circuit 84 may implement a coprocessor circuit. The coprocessor circuit 84 is generally operational to perform specific processing tasks as arranged by the processor circuit 82. In various embodiments, the coprocessor 84 may be implemented solely in hardware. The coprocessor 84 may directly execute a data flow directed to feature extraction and matching with an approximate cross-check, and generated by software that specifies processing (e.g., computer vision) tasks.

In various embodiments, the circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the coprocessor circuit 84.

The circuit 90 may implement a scheduler circuit. The scheduler circuit 90 is generally operational to schedule tasks among the circuits 92a-92n to perform a variety of computer vision related tasks as defined by the processor circuit 82. Individual tasks may be allocated by the scheduler circuit 90 to the circuits 92a-92n. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. The hardware engines 92a-92n may be implemented to include dedicated hardware circuits that are optimized for high-performance and low power consumption while performing the specific processing tasks. In some configurations, the hardware engines 92a-92n may operate in parallel and independent of each other. In other configurations, the hardware engines 92a-92n may operate collectively among each other to perform allocated tasks.

The hardware engines 92a-92n may be homogenous processing resources (e.g., all circuits 92a-92n may have the same capabilities) or heterogeneous processing resources (e.g., two or more circuits 92a-92n may have different capabilities). The hardware engines 92a-92n are generally configured to perform operators that may include, but are not limited to, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and an approximate cross-check operator. In various embodiments, the hardware engines 92a-92n may be implemented solely as hardware circuits.

The circuit 94 may implement a shared memory circuit. The shared memory 94 is generally operational to store all of or portions of the multidimensional arrays (or vectors) of input data elements and output data elements generated and/or utilized by the hardware engines 92a-92n. The input data elements may be transferred to the shared memory 94 from the DRAM circuit 86 via the memory bus 88. The output data elements may be sent from the shared memory 94 to the DRAM circuit 86 via the memory bus 88.

The path 96 may implement a transfer path internal to the coprocessor 84. The transfer path 96 is generally operational to move data from the scheduler circuit 90 to the shared memory 94. The transfer path 96 may also be operational to move data from the shared memory 94 to the scheduler circuit 90.

The circuit 100 may implement a matching process with an approximate cross-check in accordance with embodiments of the invention. In various embodiments, the matching with approximate cross-check in accordance with embodiments of the invention may be performed according to the implementation descriptions provided herein.

Following feature extraction, a set of feature points and corresponding descriptors for the reference frame R={$r_i$}, i=1, ..., $N_r$, and the current (or target) frame, T={$t_j$}, j=1, ..., $N_t$, are generally available. A memory buffer may be prepared for holding a pair of arrays configured to identify a set of valid correspondences between the reference and target frames. A first array (e.g., a BestIndex array) contains $N_t$ elements, where the j-th entry represents index (i) of the best encountered reference feature for the j-th target feature $t_j$. A second array (e.g., a BestScore array) also contains $N_t$ elements, where the j-th entry represents the best matching score for the target feature $t_j$.

When the matching with approximate cross-check process begins, the elements of the BestScore array may be initialized to a predefined value (e.g., MAXVALUE) and the elements of the BestIndex array may be initialized to an invalid index value (e.g., −1). The value MAXVALUE is generally application dependent. In some embodiments, the value of MAXVALUE may be chosen as the maximal possible score value based upon the range of possible score values. For example, if the score values may range from 0 to 255, a value of 256 may be safely chosen for MAXVALUE. In some embodiments, the type of variable that is used to store the scores may be considered and the maximal numerical value for that type of variable may be chosen as MAXVALUE. When the matching with approximate cross-check process ends, the elements of the Best-Score and BestIndex arrays contain the set of valid correspondences found.

In an example embodiment, for every feature point $r_i$ in the reference set R descriptor matching distances $Dist(D_r^i, D_t^j)$ are calculated for every feature point $t_j$ in the target set T. A check is made that matching constraints (e.g., maximal coordinate distance, maximal descriptor distance, etc.) are met (e.g., using criteria dependent on the specific apparatus). The calculated descriptor matching distances $Dist(D_r^i, D_t^j)$ are checked to obtain the correspondence representing the minimal distance (e.g., $r_i \rightarrow t_{min\_j}$), and the (min_j)-th entries of the BestScore and BestIndex arrays are updated if the current score is lower than the score that is already stored there. In general, a continuous update of the BestScore and BestIndex arrays is performed, such that at the end of the process the two arrays hold the information about the correspondences after an approximate cross-check. After running over all the feature points $r_i$ in the reference set R, the BestIndex and BestScore arrays generally hold all the valid correspondences $r_i \rightarrow t_j$.

The matching with approximate cross-check method in accordance with embodiments of the invention generally produce the set of valid correspondences in a single pass. The approximate cross check may be slightly less robust than a full (two-pass) cross check scheme. However, throughout extensive empirical testing, the approximate cross-check method in accordance with embodiment of the invention resulted in significant reduction in running time at a cost of slightly less robust matching results.

Figure 2:
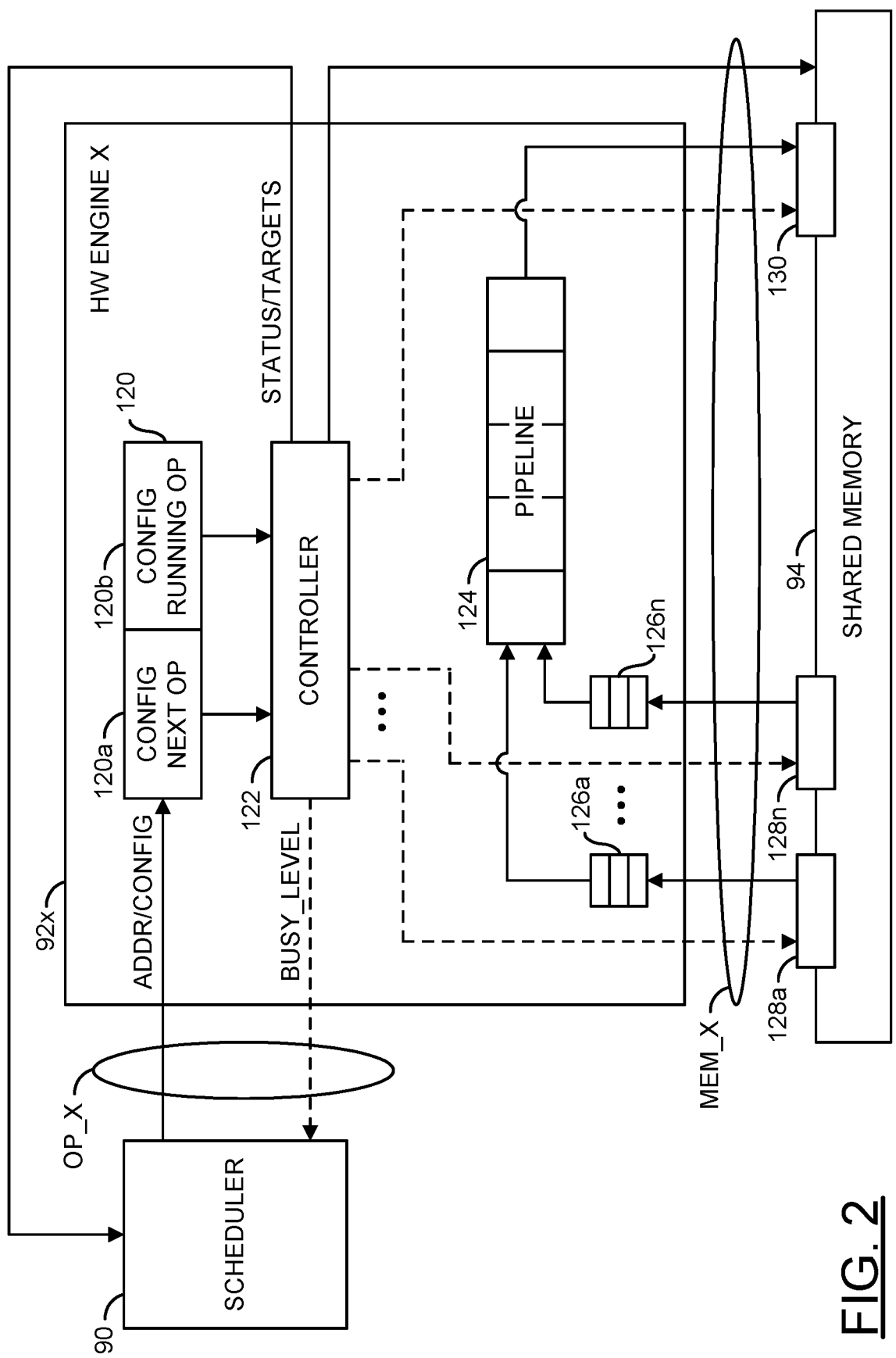
FIG. 2 is a diagram illustrating a generic implementation of a hardware engine of FIG. 1.

Referring to FIG. 2, a diagram illustrating an example implementation of a generic hardware engine 92x of FIG. 1 is shown. The hardware engine 92x may be representative of the hardware engines 92a-92n. The hardware engine 92x generally comprises a block (or circuit) 120, a block (or circuit) 122, a block (or circuit) 124, and a number of blocks (or circuits) 126a-126n. The circuit 120 may be implemented as a pair of memories (or buffers) 120a and 120b. The circuit 122 may implement a controller circuit. In an example, the circuit 122 may include one or more finite state machines (FSMs) configured to control various operators implemented by the hardware engine 92x. The circuit 124 may implement a processing pipeline of the hardware engine 92x. The circuits 126a-126n may implement first-in-first-out (FIFO) memories. The circuits 126a-126n may be configured as input buffers for the processing pipeline 124. The shared memory 94 may be configured (e.g., by signals from the circuit 122) as multiple shared input buffers 128a-128n and one or more output buffers 130.

A signal (e.g., ADDR/CONFIG) may be generated by the scheduler circuit 90 and received by the hardware engine 92x. The signal ADDR/CONFIG may carry address information and configuration data. A signal (e.g., BUSY_LEVEL) may be generated by the circuit 122 and transferred to the scheduler circuit 90. The signal BUSY_LEVEL may convey the busy level of the hardware engine 92x. A signal (e.g., STATUS/TARGETS) may be generated by the circuit 122 and transferred to the scheduler circuit 90. The signal STATUS/TARGETS may provide status information regarding the hardware engine 92x and target information for the operands.

In an example embodiment, the buffers 120a and 120b may be configured as a double-banked configuration buffer. The double-banked buffer may be operational to store configuration information for a currently running operation in one buffer (e.g., the buffer 120b) while configuration information for a next operation is being moved into the other buffer (e.g., the buffer 120a). The scheduler 90 generally loads operator configuration information, including status words in a case where the operator has been partially processed in previous operator chunks, into the double-banked buffer. Once the circuit 122 is finished with the configuration information of the running operation and the configuration information for the next operation has been received, the buffers 120a and 120b may swapped.

The circuit 122 generally implements the control circuitry of the hardware engine 92x. The circuit 122 determines when to switch from the currently running operator to the new operator. The controller 122 is generally operational to control the movement of information into, out of, and internal to the hardware engine 122x. In general, the operation of the hardware engine 92x is pipelined. During an operator switch, a front end of the pipeline 124 may already be working on data for the new operator while a tail-end of the pipeline 124 is still finishing up the processing associated with old operator.

The circuit 124 may implement a pipeline circuit. The pipeline circuit 124 is generally operational to process operands received from the shared memory 94 using functionality designed into the hardware engine 92x. The circuit 124 may communicate data resulting from the functions performed to the one or more shared buffers 130.

The buffers 126a-126n may implement FIFO buffers. The FIFO buffers 126a-126n may be operational to store operands received from the shared buffers 128a-128n for processing in the pipeline 124. In general, the number of FIFO buffers and the number of shared buffers implemented may be varied to meet the design criteria of a particular application.

Figure 3:
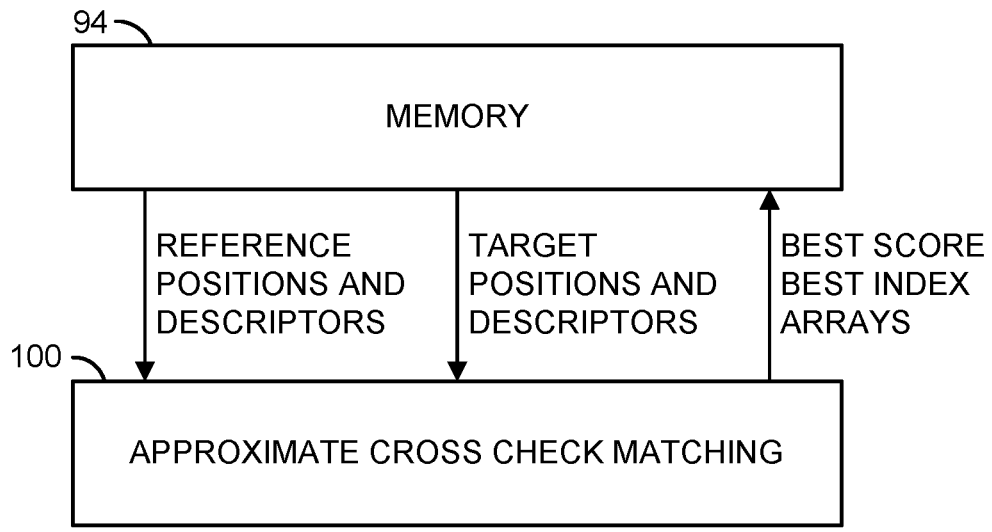
FIG. 3 is a diagram illustrating an example data flow of a matching with approximate cross-check operation in accordance with an example embodiment of the invention.

Referring to FIG. 3, a diagram is shown illustrating an example data flow of a matching with approximate cross-check operation in accordance with an example embodiment of the invention using the circuit 100 of FIG. 1. In various embodiments, the circuit 100 may be configured to obtain reference information (e.g., reference positions and descriptors) for a reference set of feature points and target information (e.g., target positions and descriptors) for a target set of feature points from the memory 94 as described above in connection with FIG. 2. In an example, the reference and target information may me transferred from an external memory (e.g., DRAM 86) to the memory 94 prior to initiating the matching with approximate cross-check method in accordance with embodiment of the invention. The circuit 100 may be further configured to communicate results (e.g., the BestScore and BestIndex arrays) of the matching with approximate cross-check method in accordance with embodiment of the invention back to the memory 94 as described above in connection with FIG. 2.

In various embodiments, the circuit 100 may implement direct memory access (DMA) engines and/or memory pipelines for moving the various information from and to the memory 94. The circuit 100 may also implement dedicated hardware circuitry for calculating descriptor matching distances in real time. In various embodiments, the circuit 100 may be configured to perform the matching with approximate cross-check method in accordance with embodiment of the invention in a single pass.

Figure 4:
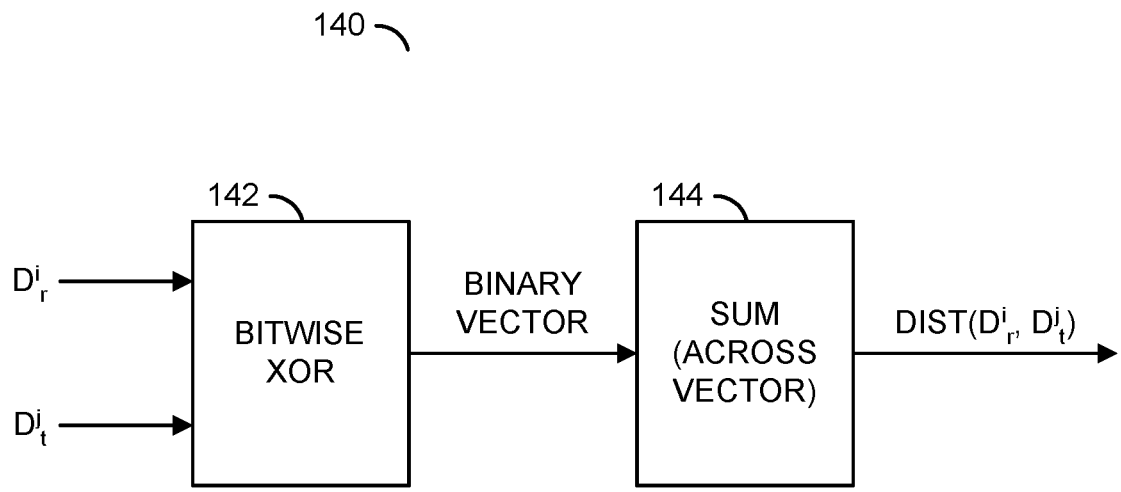
FIG. 4 is a diagram illustrating an example hardware implementation of a descriptor matching distance calculation circuit in accordance with an example embodiment of the invention.

Referring to FIG. 4, a diagram of a circuit 140 is shown illustrating an example hardware implementation of a descriptor matching distance calculation circuit in accordance with an embodiment of the invention. In various embodiments, the circuit 100 may include one or more descriptor matching distance calculation circuits 140 configured to calculate descriptor matching distances that may be used in determining valid feature correspondences between a pair of images. In some embodiments, a single instance of the descriptor matching distance calculation circuit 140 may be used repeatedly to calculate respective distances $Dist(D_r^i, D_t^j)$ for all pairs of reference feature points $r_i$ and target feature points $t_j$. In some embodiments, multiple instances of the descriptor matching distance calculation circuit 140 may be implemented to generate the respective distances $Dist(D_r^i, D_t^j)$ for multiple pairs of reference feature points $r_i$ and target feature points $t_j$ in parallel. In one example, $N_t$ instances of the descriptor matching distance calculation circuit 140 may be implemented to generate the respective distances $Dist(D_r^i, D_t^j)$ for each pair of a particular reference feature point $r_i$ and all of the target feature points $t_j$ in parallel. In an embodiment where the number of pairs is limited or the technology allows a sufficient number of instances to be implemented, multiple instances of the descriptor matching distance calculation circuit 140 may be implemented to generate the respective distances $Dist(D_r^i, D_t^j)$ for all pairs of reference feature points $r_i$ and target feature points $t_j$ in parallel. The circuit 100 may tabulate and/or process the respective distances $Dist(D_r^i, D_t^j)$ computed for all pairs of reference feature points $r_i$ and target feature points $t_j$ as illustrated in the tables and description below.

In an embodiment using descriptors with binary values, the circuit 100 may incorporate a circuit 140 that applies a bitwise exclusive-OR (XOR) to binary vectors for the descriptors $D_r^i$ and $D_t^j$, followed by summing across a result vector to obtain a hamming distance $Dist(D_r^i, D_t^j)$. In an example, the circuit 140 may comprise a block (or circuit) 142 and a block (or circuit) 144. The circuit 142 may implement a bitwise XOR. The circuit 144 may be configured to sum components of an input vector to generate a hamming distance. In an example, the circuits 142 and 144 may be implemented solely in hardware. In an example, the circuit 142 may have a first input that may receive a reference descriptor (e.g., $D_r^i$), a second input that may receive a target descriptor (e.g., $D_t^j$), and an output that may present a result vector (e.g., BINARY VECTOR). The circuit 144 may have an input that receives the result vector BINARY VECTOR and an output that presents the hamming distance $Dist(D_r^i, D_t^j)$. In various embodiments, other distance computing circuits (e.g., L2 norm calculating circuit, etc.) may be implemented accordingly to process other types (e.g., real) of descriptors.

Figure 5:
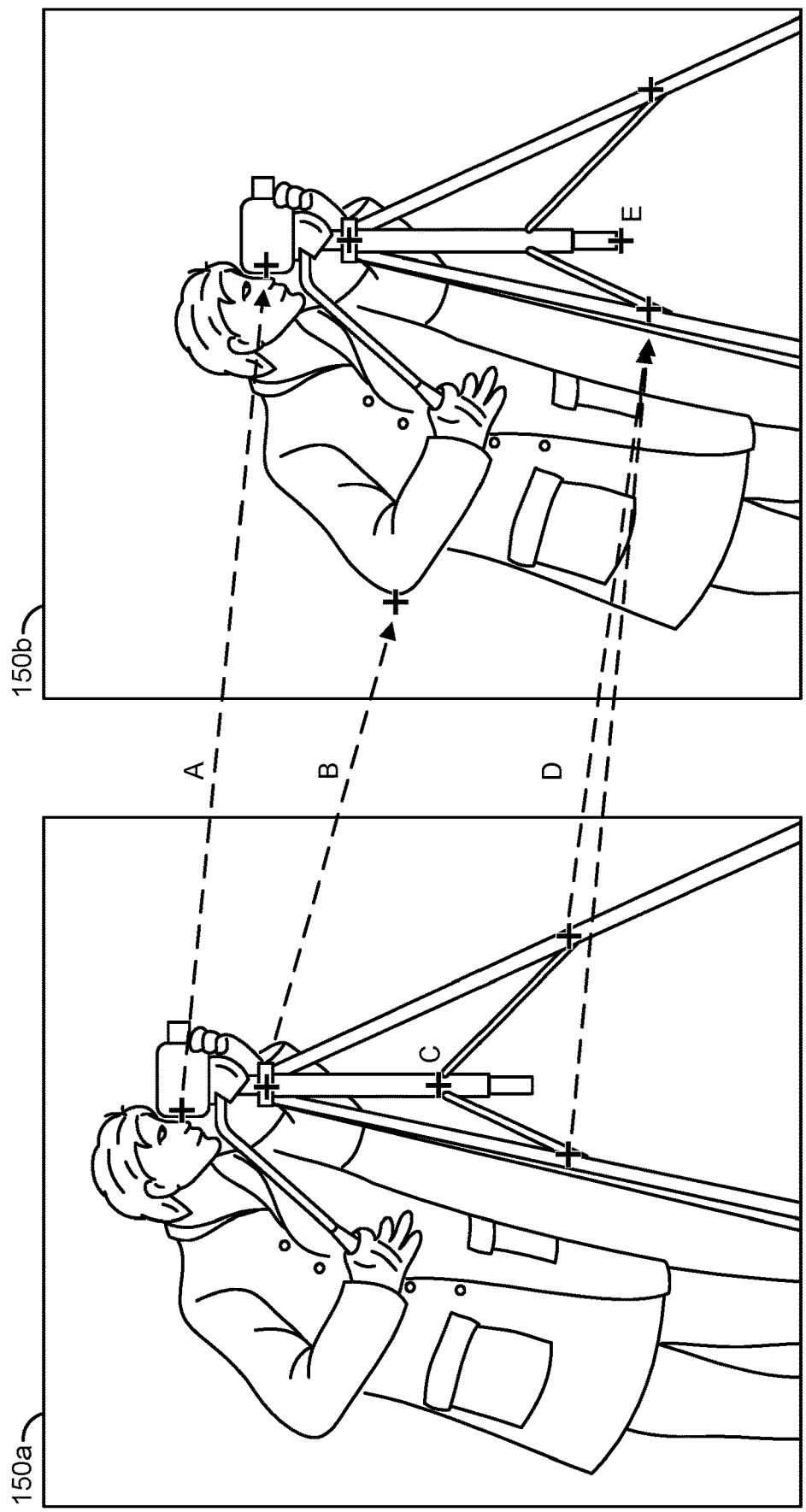
FIG. 5 is a diagram illustrating mismatching of points of interest that can occur without a cross check.

Referring to FIG. 5, a diagram is shown illustrating mismatching of points of interest that can occur with conventional techniques. Following feature point extraction, matching is performed between a reference frame 150a and a target frame 150b. The extracted feature points are marked with a '+' and a suggested match is indicated with an arrow. In case A, the corresponding feature points are matched correctly. In case B a reference feature point is wrongly matched against a target feature point (despite the fact that a corresponding target feature point exists). In case C, a reference feature point does not have a corresponding feature point in the target frame and no matching is suggested. In case D, two reference feature points are matched against the same target feature point. However, only one of the matches in case D is correct. In case E, a target feature point does not have a corresponding reference feature point and no matching is suggested.

In the conventional approach, a brute force cross check process is applied in order to minimize matching errors. Basically, the reference and target sets are switched, and for each target feature point a best correspondence from the reference feature set is found. The brute force cross check process defines a matching pair if and only if $r_i \rightarrow t_j$ and $t_j \rightarrow r_i$. The brute force cross-check process either is computationally expensive since the matching process is run twice or uses a large memory buffer in order to store the intermediate descriptor matching results. A simpler approach may only run the cross-check matching on target features that have been identified as possible pairs of the $r_i \rightarrow t_j$ matching process. However, in the worst case scenario, a full cross-check process still needs to be performed, which is costly.

Figure 6:
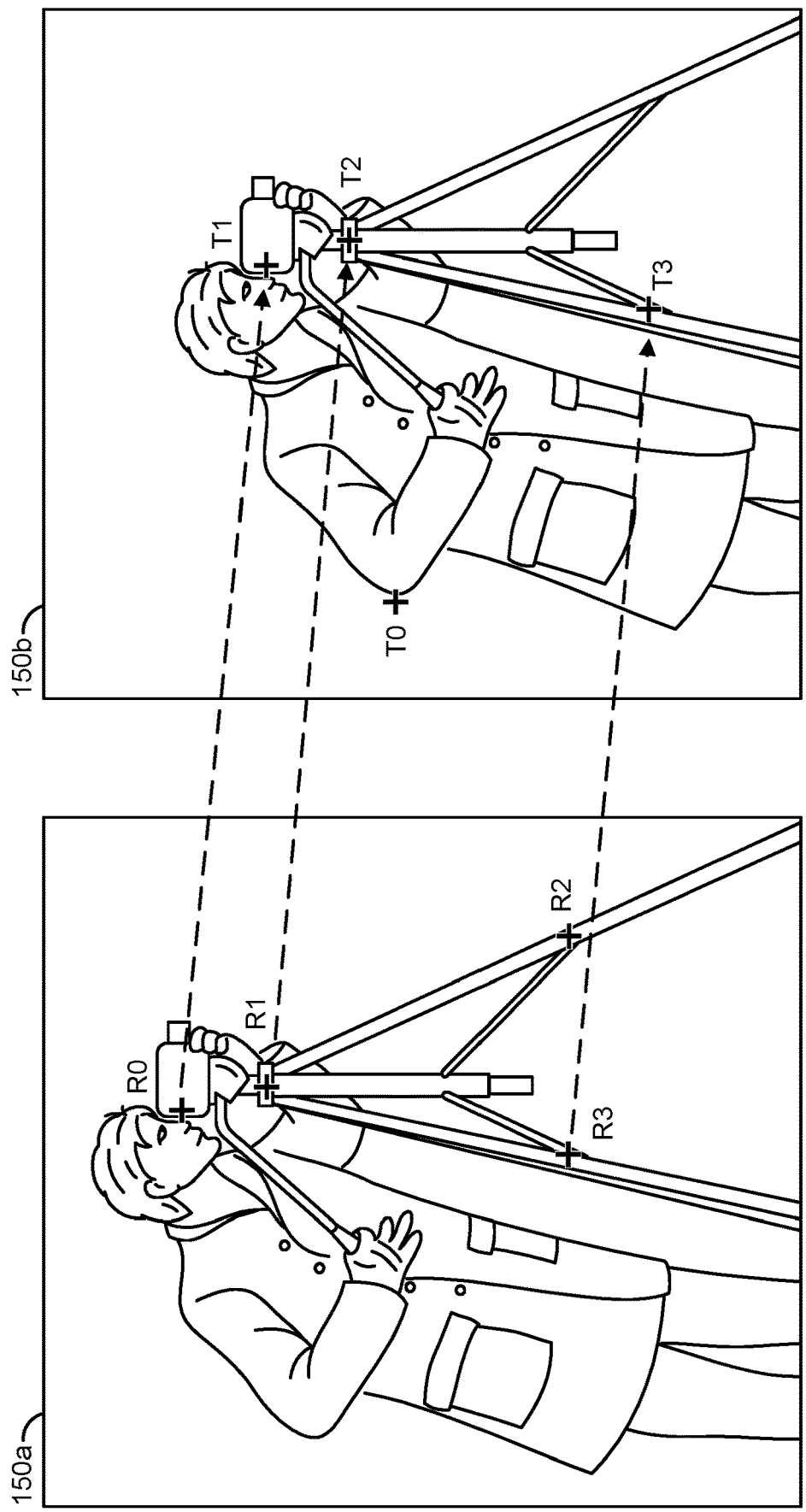
FIG. 6 is a diagram illustrating improved matching of points of interest using an approximate cross-check in accordance with an example embodiment of the invention.

Referring to FIG. 6, a diagram is shown illustrating an example result of the approximate cross-check scheme in accordance with an embodiment of the invention. During feature extraction, four feature points (e.g., $r_0$, $r_1$, $r_2$, $r_3$) are found in the reference frame 150a and four feature points (e.g., $t_0$, $t_1$, $t_2$, $t_3$) are found in the target frame 150b. The four feature points $r_0$, $r_1$, $r_2$, $r_3$ in the reference frame 150a are matched against the four feature points $t_0$, $t_1$, $t_2$, $t_3$ in the target frame 150b. The feature points are marked with '+' for clarity. Three arrows show the desired (valid) matches (correspondences).

A numerical example may be used as follows to illustrate the approximate cross-check scheme in accordance with example embodiments of the invention. In an example, the matching distance $Dist(D_r^i, D_t^j)$ for each pair of points $r_i$, $t_j$ may be calculated as shown in the following Table 1:

TABLE 1

| $Dist(D_r^i, D_t^j)$ | $t_0$ | $t_1$ | $t_2$ | $t_3$ |
|---|---|---|---|---|
| $r_0$ | 5 | 1 | 3 | — |
| $r_1$ | 3 | 6 | 2 | — |
| $r_2$ | — | — | 6 | 4 |
| $r_3$ | — | — | 6 | 2 |

In an example where a binary descriptor (e.g., BRIEF, etc.) is implemented, the distances in TABLE 1 may be calculated using a circuit similar to the circuit 140 described above in connection with FIG. 4. Entries for non-valid matches are marked with "-". While applying the matching algorithm, the BestScore and BestIndex arrays may be populated through inspection. An example of how the arrays evolve throughout the matching process is generally illustrated in the following steps.

In an initialization step, the BestScore array may be initialized to a predefined value (e.g., MAXVALUE) and the BestIndex array may be initialized to a predefined value (e.g., −1), as illustrated in the following Table 2:

TABLE 2

| j-index | BestScore | BestIndex |
|---|---|---|
| 0 | MAXVALUE | −1 |
| 1 | MAXVALUE | −1 |
| 2 | MAXVALUE | −1 |
| 3 | MAXVALUE | −1 |

Inspecting $r_{i=0}$ in Table 1, the best (e.g., smallest distance) score (1) is achieved for $t_{j=1}$. Thus, the BestScore array entry corresponding to a j-index of 1 is set to the distance value (e.g., 1) from Table 1 and the BestIndex array entry corresponding to the j-index of 1 is set to the i-index of the corresponding reference feature point (e.g., 0). The evolution of the BestScore and BestIndex arrays after investigating $r_0$ is illustrated in the following Table 3:

TABLE 3

| j-index | BestScore | BestIndex |
|---|---|---|
| 0 | MAXVALUE | −1 |
| 1 | 1 | 0 |
| 2 | MAXVALUE | −1 |
| 3 | MAXVALUE | −1 |

Inspecting $r_{i=1}$ in Table 1, the best score (2) is achieved for $t_{j=2}$. Thus, the BestScore array entry corresponding to a j-index of 2 is set to the distance value (e.g., 2) from Table 1 and the BestIndex array entry corresponding to the j-index of 2 is set to the i-index of the corresponding reference feature point (e.g., 1). The evolution of the BestScore and BestIndex arrays after investigating $r_1$ is illustrated in the following Table 4:

TABLE 4

| j-index | BestScore | BestIndex |
|---|---|---|
| 0 | MAXVALUE | −1 |
| 1 | 1 | 0 |
| 2 | 2 | 1 |
| 3 | MAXVALUE | −1 |

Inspecting $r_{i=2}$ in Table 1, the best score (4) is achieved for $t_{j=3}$. Thus, the BestScore array entry corresponding to a j-index of 3 is set to the distance value (e.g., 4) from Table 1 and the BestIndex array entry corresponding to the j-index of 3 is set to the i-index of the corresponding reference feature point (e.g., 2). The evolution of the BestScore and BestIndex arrays after investigating $r_2$ is illustrated in the following Table 5:

TABLE 5

| j-index | BestScore | BestIndex |
|---|---|---|
| 0 | MAXVALUE | −1 |
| 1 | 1 | 0 |
| 2 | 2 | 1 |
| 3 | 4 | 2 |

Inspecting $r_{i=3}$ in Table 1, the best score (2) is achieved for $t_{j=3}$. Because the current score (e.g., 2) from Table 1 is smaller than the value (e.g., 4) already stored in the BestScore array entry corresponding to a j-index of 3, the BestScore array entry corresponding to the j-index of 3 is set to the current distance value (2) from Table 1 and the BestIndex array entry corresponding to the j-index of 3 is set to the i-index of the corresponding reference feature point (e.g., 3). The evolution of the BestScore and BestIndex arrays after investigating $r_3$ is illustrated in the following Table 6:

TABLE 6

| j-index | BestScore | BestIndex |
|---|---|---|
| 0 | MAXVALUE | −1 |
| 1 | 1 | 0 |
| 2 | 2 | 1 |
| 3 | 2 | 3 |

The valid matches may be extracted upon inspection of the two arrays. For example, upon inspection of Table 6, the valid matches are found to be $r_0 \rightarrow t_1$, $r_1 \rightarrow t_2$, and $r_3 \rightarrow t_3$. No match is found for $r_2$ or $t_0$, as shown by the BestScore array entry for a j-index of 0 still containing MAXVALUE, the BestIndex array entry for the j-index of 0 still containing a value of −1, and none of the entries of the BestIndex array containing a value of 2.

Figure 7A:
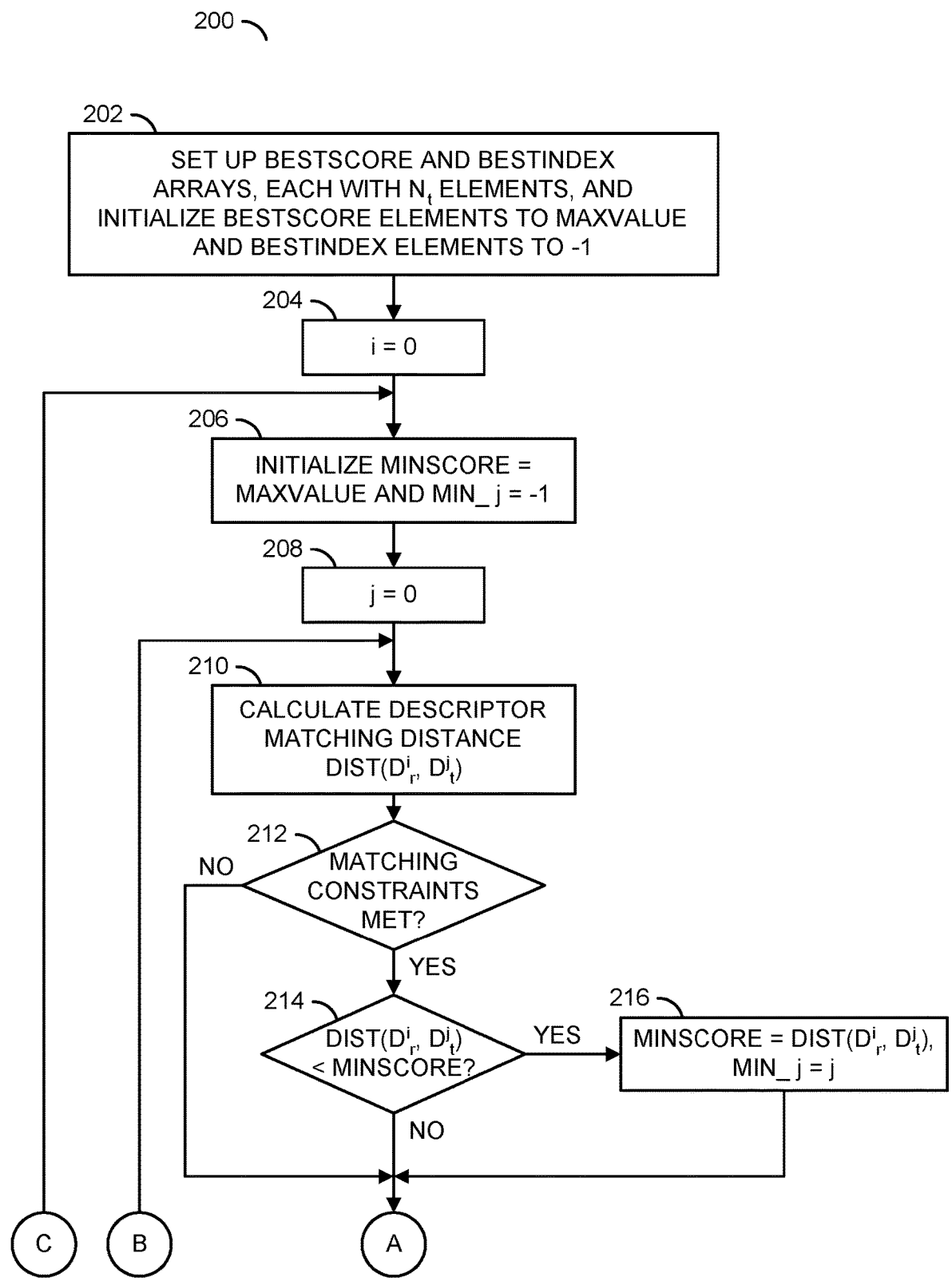
FIGS. 7A and 7B are diagrams illustrating a matching with approximate cross-check process in accordance with an example embodiment of the invention.
Figure 7B:
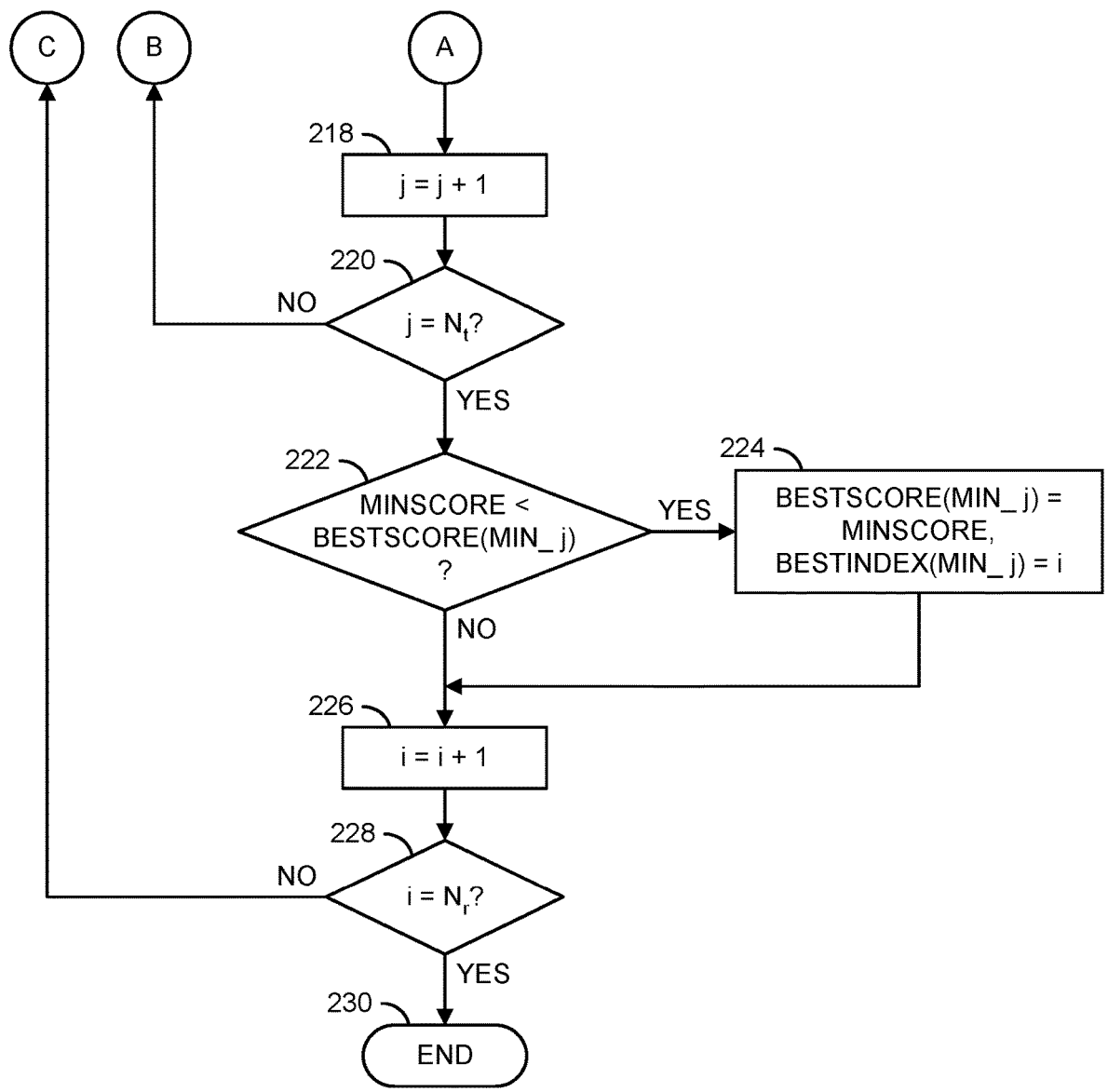

Referring to FIGS. 7A and 7B, a flow diagram of a process 200 is shown illustrating an approximate cross-check technique in accordance with an example embodiment of the invention. The process (or method) 200 generally implements feature point matching with an approximate cross-check in accordance with an example embodiment of the invention. In an example embodiment, the process 200 may comprise a step (or state) 202, a step (or state) 204, a step (or state) 206, a step (or state) 208, a step (or state) 210, a step (or state) 212, a step (or state) 214, a step (or state) 216, a step (or state) 218, a step (or state) 220, a step (or state) 222, a step (or state) 224, a step (or state) 226, a step (or state) 228, and a step (or state) 230. In an example, the process 200 may be started (executed) following feature point extraction.

The process 200 generally begins in the step 202. In the step 202, the process 200 may set up buffer space (e.g., in the memory 94) for the BestScore array and the BestIndex array. Each of the BestScore and BestIndex arrays may be set up having a number of elements equal to the number of target feature points $N_t$. The process 200 initializes the elements of the BestScore array to a predefined value (e.g., MAXVALUE) and the elements of the BestIndex array to a predefined value (e.g., −1). From the step 202, the process 200 moves to the step 204. In the step 204, the process 200 initializes a first index (e.g., i) to zero. The index i is generally used by the process 200 to access the information (e.g., positions and descriptors) related to the reference feature point set R. The process 200 then moves to the step 206.

In the step 206, the process 200 initializes a first variable (e.g., MINSCORE) to a predetermined value (e.g., MAXVALUE) and a second variable (e.g., MIN_j) to a predetermined value (e.g., −1). The process 200 then moves to the step 208. In the step 208, the process 200 initializes a second index (e.g., j) to a value of zero. The index j is generally used by the process 200 to access the information (e.g., positions and descriptors) related to the target feature point set T. The process 200 then moves to the step 210.

In the step 210, the process 200 calculates the descriptor matching distance (e.g., $\text{Dist}(D_r^i, D_t^j)$). The calculation of the distance (or score) $\text{Dist}(D_r^i, D_t^j)$ generally depends on the type of the descriptor and the specific application. For descriptors with real values (e.g., SIFT, image patch, etc.), L2/L1 norms may be used on the difference vector. The distance using the L1 norm for $D_r^i$ and $D_t^j$ is generally defined by the following equation:

$$Dist(D_r^i, D_t^j) = \sum_{n=0}^{N-1} |D_r^i[n] - D_t^j[n]|, \quad \text{EQ. 1}$$

where N is the length of the descriptor vector, $D_r^i[n]$ is the n-th element of the vector $D_r^i$, and $D_t^j[n]$ is the n-th element of the vector $D_t^j$. The distance using the L2 norm for $D_r^i$ and $D_t^j$ is generally defined by the following equation:

$$Dist(D_r^i, D_t^j) = \|D_r^i - D_t^j\|_2 = \sqrt{\sum_{n=0}^{N-1} (D_r^i[n] - D_t^j[n])^2}, \quad \text{EQ. 2}$$

where N is the length of the descriptor vector, $D_r^i[n]$ is the n-th element of the vector $D_r^i$, and $D_t^j[n]$ is the n-th element of the vector $D_t^j$. For descriptors with binary values (e.g. BRIEF, etc.), a hamming distance may be used that applies, for example, a bitwise XOR operation over the two descriptors and then sums the resulting 1's: $Dist(D_r^i, D_t^j) = SUM(XOR(D_r^i, D_t^j))$. The process 200 then moves to the step 212.

In the step 212, the process 200 checks to see whether the calculated descriptor matching distance is within predefined matching constraints (e.g., maximal coordinate distance, maximal descriptor distance, etc.). Determination of whether the matching constraints are met is generally done using criteria dependent on the specific apparatus. If the matching constraints are met, the process 200 moves to the step 214. If the matching constraints are not met, the process 200 skips to the step 218. In the step 214, the process 200 determines whether the calculated (current) descriptor matching distance is less than the value held in the variable MINSCORE. If the calculated (current) descriptor matching distance is less than MINSCORE, the process 200 moves to the step 216, where the value stored in the variable MINSCORE is replaced by the current descriptor matching distance and the value in the variable MIN_j is replaced by the current value of the index j. The process 200 then moves to the step 218.

In the step 218, the process 200 increments the index j and moves to the step 220. In the step 220, the process 200 checks to see whether the index j has reached $N_t$, the number of target features points in the target set. If all the target feature points have not been processed, the process 200 returns to the step 210 to begin processing the next target feature point. If the number of target feature points in the target set has been reached, the process 200 moves to the step 222. In the step 222, the process 200 checks to see whether the value in the variable MINSCORE is less than the value stored in the (MIN_j)-th entry of the BestScore array (BestScore(MIN_j)). If MINSCORE is less than the (MIN_j)-th entry in the BestScore array, the process 200 moves to the step 224. If the value MINSCORE is not less than the (MIN-j)-th entry in the BestScore array, the process 200 moves to the step 226. In the step 224, the process 200 replaces the value in the (MIN-j)-th entry of the BestScore array with the current MINSCORE value and replaces the value in the (MIN_j)-th entry of the BestIndex array (BestIndex (MIN_j)) with the current value of the index i. The process 200 then moves to the step 226.

In the step 226, the process 200 increments the index i and moves to the step 228. In the step 228, the process 200 checks to see whether all of the reference feature points have been processed (e.g., i=$N_r$). If all of the reference feature points have not been processed, the process 200 returns to the step 206 to begin processing the next reference feature point. Otherwise, the process 200 moves to the step 230 and terminates. When the process 200 terminates, the BestScore and BestIndex arrays generally contain the set of valid correspondences. The process 200 generally allows determining the set of valid correspondences using the matching with approximate cross-check in accordance with embodiments of the invention to be performed in a single pass.

Referring to FIG. 8, a diagram of a camera system 400 is shown illustrating an example implementation of a computer vision system in accordance with an embodiment of the invention. In one example, the electronics of the camera system 400 may be implemented as one or more integrated circuits. In an example, the camera system 400 may be built around a processor/camera chip (or circuit) 402. In an example, the processor/camera chip 402 may be implemented as an application specific integrated circuit (ASIC) or system on chip (SOC). The processor/camera circuit 402 generally incorporates hardware and/or software/firmware that may be configured to implement the processors, circuits, and processes described above in connection with FIG. 1 through FIG. 7B.

In an example, the processor/camera circuit 402 may be connected to a lens and sensor assembly 404. In some embodiments, the lens and sensor assembly 404 may be a component of the processor/camera circuit 402 (e.g., a SoC component). In some embodiments, the lens and sensor assembly 404 may be a separate component from the processor/camera circuit 402 (e.g., the lens and sensor assembly may be an interchangeable component compatible with the processor/camera circuit 402). In some embodiments, the lens and sensor assembly 404 may be part of a separate camera connected to the processor/camera circuit 402 (e.g., via a video cable, a high definition media interface (HDMI) cable, a universal serial bus (USB) cable, an Ethernet cable, or wireless link).

The lens and sensor assembly 404 may comprise a block (or circuit) 406 and/or a block (or circuit) 408. The circuit 406 may be associated with a lens assembly. The circuit 408 may be an image sensor. The lens and sensor assembly 404 may comprise other components (not shown). The number, type and/or function of the components of the lens and sensor assembly 404 may be varied according to the design criteria of a particular implementation.

The lens assembly 406 may capture and/or focus light input received from the environment near the camera 60. The lens assembly 406 may capture and/or focus light for the image sensor 408. The lens assembly 406 may implement an optical lens. The lens assembly 406 may provide a zooming feature and/or a focusing feature. The lens assembly 406 may be implemented with additional circuitry (e.g., motors) to adjust a direction, zoom and/or aperture of the lens assembly 406. The lens assembly 406 may be directed, tilted, panned, zoomed and/or rotated to provide a targeted view of the environment near the camera 60.

The image sensor 408 may receive light from the lens assembly 406. The image sensor 408 may be configured to transform the received focused light into digital data (e.g., bitstreams). In some embodiments, the image sensor 408 may perform an analog to digital conversion. For example, the image sensor 408 may perform a photoelectric conversion of the focused light received from the lens assembly

406. The image sensor 408 may present converted image data as a color filter array (CFA) formatted bitstream. The processor/camera circuit 402 may transform the bitstream into video data, video files and/or video frames (e.g., human-legible content).

The processor/camera circuit 402 may also be connected to (i) an optional audio input/output circuit including an audio codec 410, a microphone 412, and a speaker 414, (ii) a memory 416, which may include dynamic random access memory (DRAM), (iii) a non-volatile memory (e.g., NAND flash memory) 418, a removable media (e.g., SD, SDXC, etc.) 420, one or more serial (e.g., RS-485, RS-232, etc.) devices 422, one or more universal serial bus (USB) devices (e.g., a USB host) 424, and a wireless communication device 426.

In various embodiments, the processor/camera circuit 402 may comprise one or more blocks (or circuits) 430, one or more blocks (or circuits) 432, a block (or circuit) 434, a block (or circuit) 436, a block (or circuit) 438, a block (or circuit) 440, a block (or circuit) 442, a block (or circuit) 444, a block (or circuit) 446, a block (or circuit) 448, a block (or circuit) 450, and/or a block (or circuit) 452. The circuit 430 may be a processor circuit. In various embodiments, the circuit(s) 430 may include one or more embedded processors (e.g., ARM, etc.). The circuit(s) 432 may implement one or more computer vision coprocessor circuits. The circuit 434 may be a digital signal processing (DSP) module. In some embodiments, the circuit 434 may implement separate image DSP and video DSP modules. The circuit 436 may be a storage interface. The circuit 436 may interface the processor/camera circuit 402 with the DRAM 416, the non-volatile memory 418, and the removable media 420.

The circuit 438 may implement a local memory system. In some embodiments, the local memory system 438 may include, but is not limited to a cache (e.g., L2CACHE), a direct memory access (DMA) engine, graphic direct memory access (GDMA) engine, and fast random access memory. The circuit 440 may implement a sensor input (or interface). The circuit 442 may implement one or more control interfaces including but not limited to an inter device communication (IDC) interface, an inter integrated circuit ($I^2C$) interface, a serial peripheral interface (SPI), and a pulse width modulation (PWM) interface. The circuit 444 may implement an audio interface (e.g., an $I^2S$ interface, etc.). The circuit 446 may implement a clock circuit including but not limited to a real time clock (RTC), a watchdog timer (WDT), and/or one or more programmable timers. The circuit 448 may implement an input/output (I/O) interface. The circuit 450 may be a video output module. The circuit 452 may be a communication module. The circuits 430 through 452 may be connected to each other using one or more buses, interfaces, traces, protocols, etc.

The circuit 418 may be implemented as a nonvolatile memory (e.g., NAND flash memory, NOR flash memory, etc.). The circuit 420 may comprise one or more removable media cards (e.g., secure digital media (SD), secure digital extended capacity media (SDXC), etc.). The circuit 422 may comprise one or more serial interfaces (e.g., RS-485, RS-232, etc.). The circuit 424 may be an interface for connecting to or acting as a universal serial bus (USB) host. The circuit 426 may be a wireless interface for communicating with a user device (e.g., a smart phone, a computer, a tablet computing device, cloud resources, etc.). In various embodiments, the circuits 404-426 may be implemented as components external to the processor/camera circuit 402. In some embodiments, the circuits 404-426 may be components on-board the processor/camera circuit 402.

The control interface 442 may be configured to generate signals (e.g., IDC/I2C, STEPPER, IRIS, AF/ZOOM/TILT/PAN, etc.) for controlling the lens and sensor assembly 404. The signal IRIS may be configured to adjust an iris for the lens assembly 406. The interface 442 may enable the processor/camera circuit 402 to control the lens and sensor assembly 404.

The storage interface 436 may be configured to manage one or more types of storage and/or data access. In one example, the storage interface 436 may implement a direct memory access (DMA) engine and/or a graphics direct memory access (GDMA). In another example, the storage interface 436 may implement a secure digital (SD) card interface (e.g., to connect to the removable media 420). In various embodiments, programming code (e.g., executable instructions for controlling various processors and encoders of the processor/camera circuit 402) may be stored in one or more of the memories (e.g., the DRAM 416, the NAND 418, etc.). When executed by the processor 430, the programming code generally causes one or more components in the processor/camera circuit 402 to configure video synchronization operations and start video frame processing operations. The resulting compressed video signal may be presented to the storage interface 436, the video output 450 and/or communication interface 452. The storage interface 436 may transfer program code and/or data between external media (e.g., the DRAM 416, the NAND 418, the removable media 420, etc.) and the local (internal) memory system 438.

The sensor input 440 may be configured to send/receive data to/from the image sensor 408. In one example, the sensor input 440 may comprise an image sensor input interface. The sensor input 440 may be configured to transmit captured images (e.g., picture element, pixel, data) from the image sensor 408 to the DSP module 434, the processor 430 and/or the coprocessor 432. The data received by the sensor input 440 may be used by the DSP 434 to determine a luminance (Y) and chrominance (U and V) values from the image sensor 408. The sensor input 440 may provide an interface to the lens and sensor assembly 404. The sensor input interface 440 may enable the processor/camera circuit 402 to capture image data from the lens and sensor assembly 404.

The audio interface 434 may be configured to send/receive audio data. In one example, the audio interface 444 may implement an audio inter-IC sound ($I^2S$) interface. The audio interface 444 may be configured to send/receive data in a format implemented by the audio codec 404.

The DSP module 434 may be configured to process digital signals. The DSP module 434 may comprise an image digital signal processor (IDSP), a video digital signal processor DSP (VDSP) and/or an audio digital signal processor (ADSP). The DSP module 434 may be configured to receive information (e.g., pixel data values captured by the image sensor 408) from the sensor input 440. The DSP module 434 may be configured to determine the pixel values (e.g., RGB, YUV, luminance, chrominance, etc.) from the information received from the sensor input 440. The DSP module 434 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 448 may be configured to send/receive data. The data sent/received by the I/O interface 448 may be miscellaneous information and/or control data. In one example, the I/O interface 448 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 450 may be configured to send video data. For example, the processor/camera circuit 402 may be connected to an external device (e.g., a TV, a monitor, a laptop computer, a tablet computing device, etc.). The video output module 450 may implement a high-definition multimedia interface (HDMI), a PAL/NTSC interface, an LCD/TV/Parallel interface and/or a DisplayPort interface.

The communication module 452 may be configured to send/receive data. The data sent/received by the communication module 452 may be formatted according to a particular protocol (e.g., BLUETOOTH, USB, Wi-Fi, UART, etc.). In one example, the communication module 452 may implement a secure digital input output (SDIO) interface. The communication module 452 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 452 may also include support for communicating using one or more of the universal serial bus protocols (e.g., USB 1.0, 2.0, 3.0, etc.). The processor/camera circuit 402 may also be configured to be powered via a USB connection. However, other communication and/or power interfaces may be implemented accordingly to meet the design criteria of a particular application.

The processor/camera circuit 402 may be configured (e.g., programmed) to control the one or more lens assemblies 406 and the one or more image sensors 408. The processor/camera circuit 402 may receive raw image data from the image sensor(s) 408. The processor/camera circuit 402 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 402 may receive encoded and/or uncoded (e.g., raw) audio data at the audio interface 444. The processor/camera circuit 402 may also receive encoded audio data from the communication interface 452 (e.g., USB and/or SDIO). The processor/camera circuit 402 may provide encoded video data to the wireless interface 426 (e.g., using a USB host interface). The wireless interface 426 may include support for wireless communication by one or more wireless and/or cellular protocols such as BLUETOOTH, ZIGBEE, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 402 may also include support for communication using one or more of the universal serial bus protocols (e.g., USB 1.0, 2.0, 3.0, etc.).

The approximate cross-check for real time feature matching in accordance with embodiments of the invention may be slightly less robust than a full cross-check scheme. In an example, the notation $r_{i0}$ and $t_{j0}$ may be used to represent a specific (yet general) correspondence. The terms $r_{i0}$ and $t_{j0}$ do not necessarily refer to reference and target feature points corresponding to i=0 and j=0, respectively. In the full cross-check scheme, a suggested correspondence $r_{i0} \to t_{j0}$ will be checked against all possible $r_i \in R$, for the best $t_{j0} \to r_i$ match. In the approximate cross-check scheme in accordance with embodiments of the invention, $t_{j0}$ will be checked against a sub-set of R for which $r_i \to t_{j0}$. In the context of cross-check error handling, most relevant checks are against reference feature points $r_i$ that have a small matching distance, which will usually result in a match with $t_{j0}$. Throughout extensive empirical testing, the approximate cross-check scheme in accordance with embodiments of the invention resulted in significant reduction in running time at a cost of slightly less robust matching results.

The functions and structures illustrated in the diagrams of FIGS. 1 to 8 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of feature matching comprising the steps of:
    determining a set of correspondences between a set of reference feature points for a first image and a set of target feature points for a second image using a processor to compute a descriptor matching function for each pair of reference and target feature points; and
    reducing the set of correspondences using said processor to perform an approximate cross-check to obtain a set of valid correspondences based upon said descriptor matching function computed for each pair of feature points and continuously update the set of valid correspondences found after the approximate cross-check.

2. The method according to claim 1, wherein the determining and reducing steps are performed concurrently.

3. The method according to claim 1, wherein the determining and reducing steps generate said set of valid correspondences using a single pass through said set of reference feature points.

4. The method according to claim 1, wherein said feature matching is performed with said approximate cross-check in real time.

5. The method according to claim 1, wherein the set of valid correspondences found after the approximate cross-check are identified using a pair of arrays and the processor continuously updates the pair of arrays identifying the valid correspondences.

6. The method according to claim 1, wherein said descriptor matching function compares two corresponding descriptors of each pair of reference and target feature points.

7. The method according to claim 1, wherein:
for binary descriptors said descriptor matching function computes a hamming distance; and
for real descriptors said descriptor matching function computes at least one of an L1 norm, an L2 norm, or a combination thereof.

8. The method according to claim 1, wherein said first image and said second image comprise at least one of (i) frames in a video sequence and (ii) pictures of a scene taken at different points in time.

9. The method according to claim 1, further comprising:
generating at least one of an estimate of ego-motion of a computer vision platform and a motion model of observed objects in a scene.

10. An apparatus comprising:
a memory interface configured to perform read and write operations on a memory; and
a processor configured to (i) determine a set of correspondences between a set of reference feature points for a first image and a set of target feature points for a second image by computing a descriptor matching function for each pair of reference and target feature points, and (ii) reduce the set of correspondences by performing an approximated cross-check scheme to obtain a set of valid correspondences based upon said descriptor matching function computed for each pair of feature points and continuously updating the set of valid correspondences found after the approximate cross-check.

11. The apparatus according to claim 10, wherein said processor determines and reduces the set of correspondences concurrently.

12. The apparatus according to claim 10, wherein said processor generates said set of valid correspondences using a single pass through said set of reference feature points.

13. The apparatus according to claim 10, wherein said processor is further configured to continuously update a pair of arrays identifying the valid correspondences found after the approximate cross-check.

14. The apparatus according to claim 10, wherein said descriptor matching function compares two corresponding descriptors of each pair of reference and target feature points.

15. The apparatus according to claim 10, wherein:
for binary descriptors said descriptor matching function computes a hamming distance; and
for real descriptors said descriptor matching function computes at least one of an L1 norm, an L2 norm, or a combination thereof.

16. The apparatus according to claim 15, wherein said descriptor matching function for binary descriptors is computed using a circuit configured to generate a vector through a bitwise exclusive-OR of two corresponding descriptors of each pair of reference and target feature points and sum across the vector.

17. The apparatus according to claim 10, wherein said first image and said second image are at least one of frames in a video sequence or pictures of a scene taken at different points in time.

18. The apparatus according to claim 10, wherein said memory interface and said processor are implemented on a single integrated circuit.

19. The apparatus according to claim 10, wherein said memory interface and said processor are part of a system on chip.

20. The apparatus according to claim 10, wherein said memory interface and said processor are part of a processor chip of digital camera.

* * * * *